(12) United States Patent
Mankame et al.

(10) Patent No.: US 8,864,403 B2
(45) Date of Patent: Oct. 21, 2014

(54) JOINING OR FASTENING COMPONENTS CONTAINING A SHAPE MEMORY POLYMER

(71) Applicant: GM Global Technology Operations LLC, Detroit, MI (US)

(72) Inventors: Nilesh D. Mankame, Ann Arbor, MI (US); Paul W. Alexander, Ypsilanti, MI (US); Alan L. Browne, Grosse Pointe, MI (US); Nancy L. Johnson, Northville, MI (US); Xiujie Gao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/859,003

(22) Filed: Apr. 9, 2013

(65) Prior Publication Data

US 2013/0223918 A1 Aug. 29, 2013

Related U.S. Application Data

(63) Continuation of application No. 12/703,337, filed on Feb. 10, 2010, now Pat. No. 8,438,714.

(51) Int. Cl.
*F01D 15/02* (2006.01)
*B23P 11/02* (2006.01)
*F16B 17/00* (2006.01)
*F16B 1/00* (2006.01)

(52) U.S. Cl.
CPC .............. *F16B 17/00* (2013.01); *F16B 1/0014* (2013.01)
USPC .............................. 403/28; 29/447

(58) Field of Classification Search
CPC ........ F16B 17/00; F16B 1/0014; F16B 15/00; C08L 2201/12; F16C 2202/28; F16C 33/3887
USPC ................ 403/28, 30; 29/447, 446, 428, 505; 428/35.7

See application file for complete search history.

(56) References Cited

FOREIGN PATENT DOCUMENTS

JP         2004357748      * 12/2004

* cited by examiner

*Primary Examiner* — John C Hong
(74) *Attorney, Agent, or Firm* — Quinn Law Group, PLLC (57) ABSTRACT

A releasable connection connects a first component to a second component. The second component includes and is manufactured from a Shape Memory Polymer (SMP), and defines a pocket. The first component includes a portion disposed within the pocket. The pocket is deformed from an initial shape permitting insertion of the portion into the pocket to assembly the releasable connection into a connected shape wherein the pocket is deformed to secure the first component relative to the second component. The pocket is transformed from the initial shape into the connected shape by heating the SMP material of the second component to a switching temperature. Re-heating the SMP second component to the switching temperature returns the pocket back to the initial shape from the connected shape to disassembly the releasable connection.

7 Claims, 4 Drawing Sheets

JOINING OR FASTENING COMPONENTS CONTAINING A SHAPE MEMORY POLYMER

CROSS-REFERENCE TO RELATED APPLICATIONS

This application is a continuation of U.S. patent application Ser. No. 12/703,337, filed on Feb. 10, 2010.

TECHNICAL FIELD

The invention generally relates to releasable connections between a first component and a second, Shape Memory Polymer (SMP) component.

BACKGROUND OF THE INVENTION

There are many articles of manufacture that require a first component be releasable connected to a second component, i.e., the first component must be connected to the second component in a manner that permits removal of the first component from the second component. Such releasable connections typically include mechanical fasteners or the like that hold separate work pieces together. Removal of the mechanical fasteners disassembles the work pieces. Alternatively, adhesives have been utilized to bond the various work pieces together. The adhesive bond between the separate work pieces must be broken in order to disassemble the work pieces.

SUMMARY OF THE INVENTION

A method of manufacturing a releasable connection between a first component and a second component manufactured from a shape memory polymer is disclosed. The method includes forming the second component into an initial shape to define a pocket. The method further includes inserting a portion of the first component into the pocket. The method further includes heating the second component to a switching temperature, wherein the second component is malleable at the switching temperature. The method further includes deforming the pocket into a connected shape to grasp the first component and secure the first component relative to the second component; and cooling the pocket while maintaining the connected shape of the pocket. The pocket is cooled until the second component independently retains the connected shape. The second component is malleable in response to re-heating the second component to the switching temperature to release the first component from the pocket.

In another aspect of the invention, a releasable connection is disclosed. The releasable connection includes a first component having a stiffness at a switching temperature. The releasable connection further includes a second component having a stiffness at the switching temperature that is less than the stiffness of the first component. The second component is manufactured from a shape memory polymer, and defines a pocket. The first component includes a portion disposed within the pocket, with the pocket formed into a connected shape configured for securing the first component relative to the second component. The pocket is transformable from the connected shape into an initial shape configured for releasing the portion in response to the second component being heated to the switching temperature, thereby permitting removal of the portion from the pocket.

In another aspect of the invention, a releasable fastener is disclosed. The releasable fastener includes a base and an extendable member. The extendable member is attached to the base, and is manufactured from a shape memory polymer. The extendable member includes an initial position, and is configured for extending from the initial position upon heating to a switching temperature. Extending from the initial position permits an end portion of the extendable member to pass through an opening in a substrate. The end portion of the extendable member is configured for returning to the initial position upon cooling to below the switching temperature to secure the substrate between the base and the end portion.

Accordingly, the subject invention discloses a releasable connection between a first component and a second component. The second component is manufactured from a shape memory polymer, which enables the second component to be formed into a connected shape from an initial shape when heated to the switching temperature. When in the connected shape, the second component secures the first component in place. As such, the disclosed releasable connection does not require any fasteners or adhesives to connect the first component to the second component, which reduces the cost of manufacturing the releasable connection and reduces the effort to disassembly and reassembly the releasable connection.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Referring to the Figures, wherein like numerals indicate like parts throughout the several views, a releasable connection is shown generally at 20. The releasable connection 20 includes a first component 22 and a second component 24. The second component 24 is manufactured from a Shape Memory Polymer (SMP).

Thermally activated SMPs undergo a significant drop in modulus across a characteristic temperature known as the switching temperature (Tx) e.g. the storage modulus of a polyurethane-based SMP drops from approximately 131 MPa below its glass transition temperature (Tg, which is the switching temperature for this SMP) to approximately 4 MPa above its Tg over a range of approximately 20° C. Beyond this point SMPs exhibit a finite (typically 10° C. or more) leathery plateau where the modulus remains at a low value and the material can be deformed easily (e.g. up to 300% in some cases) without causing irreversible damage.

SMPs are generally defined to include a permanent shape and a temporary shape. The permanent shape is the as manufactured shape to which the SMP attempts to revert when it is above the switching temperature and is not subjected to any loads and there are no obstacles that prevent this reversion. The temporary shape is the shape that the SMP is deformed into by external forces or obstacles above the switching temperature. The SMP may be stored in the temporary shape for extended periods of time as long as the SMP is not exposed to the stimulus, e.g., heat, that drives the recovery of permanent shape of the SMP. However, the SMP may include a triple shape memory polymer, which is capable of memorizing both the permanent shape and an intermediate shape defined at a temperature intermediate to the high and low temperatures of the SMP. If a triple SMP is used, then the temporary shape, e.g., a disassembled state, as well as the permanent shape, e.g., an assembled state, may be programmed into the SMP. Accordingly, transitioning to the desired shape using a triple SMP is merely a matter of heating the SMP to the appropriate temperature to obtain either the intermediate shape or the permanent shape.

The SMP is generally described to include the switching temperature, a forming temperature and a setting temperature. The forming temperature is greater than the switching temperature, and the switching temperature is greater than the setting temperature, i.e., the forming temperature>the switching temperature>the setting temperature. The switching temperature is the temperature of the SMP at which the change in properties nominally occurs. However, the change in properties of the SMP may not happen abruptly at the switching temperature, so to ensure a relative soft material, the shape programming of the SMP may occur at the forming temperature. Similarly, upon cooling, the SMP may not recover all of its original properties abruptly at the switching temperature. Accordingly, the SMP may be cooled to the setting temperature to ensure full recovery of the permanent shape of the SMP.

The first component 22 includes a stiffness at the switching temperature. The second component 24 defines a pocket 26, and includes a stiffness at or above the switching temperature that is less than the stiffness of the first component 22 at the switching temperature. More specifically, the first component 22 includes a stiffness that is considerably less than the stiffness of the second component 24 when at the joining temperature to ensure that the first component 22 does not deform when heated during assembly of the releasable connection 20.

The first component 22 includes a portion 28 disposed within the pocket 26. The pocket 26 is formed from an initial shape that permits insertion of the portion 28 into the pocket 26 into a connected shape that is configured for securing the first component 22 relative to the second component 24. Accordingly, the second component 24 includes the initial shape prior to assembly. During assembly, the portion 28 of the first component 22 is inserted into the pocket 26, and the pocket 26 is formed into the connected shape to secure the portion 28 within the pocket 26. If the connected shape is the permanent shape, then transformation of the pocket 26 from the initial shape to the connected shape may occur upon heating the second component 24 to the switching temperature. Furthermore, having the connected shape be the permanent shape provides a strong connection that is resistant to disassembly. If the initial shape is the permanent shape, then transformation of the pocket 26 from the initial shape to the connected shape may occur upon heating the second component 24 to the switching temperature, deforming the pocket 26 into the connected shape and cooling the second component 24 to retain the connected shape. Furthermore, having the initial shape be the permanent shape provides for easy disassembly of the releasable connection 20. Because the first component 22 includes a stiffness at the switching temperature that is higher than the stiffness of the second component 24 at the switching temperature, the shape of the first component 22 is not altered when forming the pocket 26 from the initial shape into the connected shape. It should be appreciated that the initial shape of the SMP may be either the temporary shape or the permanent shape, and that the connected shape is the other of the temporary shape or the permanent shape.

Because of the properties of the SMP second component 24, the pocket 26 may be transformed from the connected shape into the initial shape to release the portion 28 of the first component 22. The pocket 26 transforms from the connected shape back into the initial shape in response to the second component 24 being heated to the switching temperature when the initial shape is the permanent shape and there are no external loads acting on or obstacles preventing the recovery of the SMP. If the initial shape is the temporary shape, external force is exerted on the pocket 26 at the forming temperature of the SMP to allow the portion 28 to be extricated from the pocket 26. In either case, removal of the portion 28 from the pocket 26 for maintenance or the like is straightforward.

Figure 1:
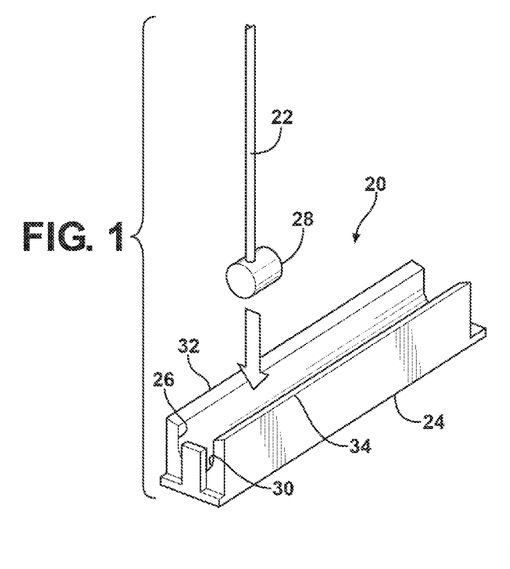
FIG. 1 is a schematic perspective view of a first embodiment of a releasable connection in a disassembled state.
Figure 2:
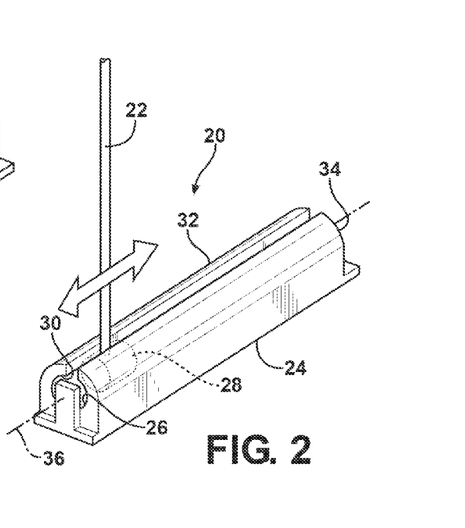
FIG. 2 is a schematic perspective view of the first embodiment of the releasable connection in an assembled state.

Referring to FIGS. 1 and 2, a first alternative embodiment of the releasable connection 20 is shown. The releasable connection 20 is shown as a slotted connection in FIGS. 1 and 2. The second component 24 includes a base 30, a first wall 32 and a second wall 34. The first wall 32 and the second wall 34 are disposed on opposite lateral edges of the base 30 in opposition to each other. The base 30, the first wall 32 and the second wall 34 extend along a longitudinal axis 36. The pocket 26 includes a channel defined by and between the base 30, the first wall 32 and the second wall 34. The pocket 26 extends along the longitudinal axis 36. The portion 28 of the first component 22 disposed within the pocket 26 includes a bulbous end portion 28, wherein the bulbous end portion 28 includes a cylindrical portion 28 extending a pre-determined distance along the longitudinal axis 36.

As shown in FIG. 1, the first wall 32 and the second wall 34 are generally perpendicular relative to the base 30 and define a generally rectangular pocket 26 when in their initial shape. Upon transformation into the connected shape shown in FIG. 2, the distal edges of the first wall 32 and the second wall 34, i.e., the edges furthest from the base 30, are curled inward toward each other to enclose the cylindrical portion 28 of the first component 22, and define a generally cylindrical pocket 26. Accordingly, the cylindrical portion 28 of the first component 22 is moveable within the cylindrical pocket 26. It should be appreciated that the movement of the cylindrical portion 28 within the cylindrical pocket 26 includes an engineered, i.e., intended movement along a plane or axis, and excludes minor movement caused by excessive wear of the releasable connection 20 and/or improper assembly of the releasable connection 20. More specifically, the first component 22 is slideably moveable within the pocket 26 relative to the second component 24. Additionally, a resistance to movement of the second component 24 relative to the first component 22 is adjustable. The resistance to movement may be adjusted, for example, by varying a gap and/or a contact pressure between the cylindrical portion 28 and the cylindrical pocket 26. As such, the resistance to movement may be adjusted to account for wear of the releasable connection 20 over time by adjusting the geometry of the releasable connection 20 to vary the gap and/or contact pressure.

As briefly described above, the first wall 32 and the second wall 34 may be returned to their initial shape, i.e., the rectangular shape, upon being heated to the switching temperature in the absence of any external loads or obstacles to release the cylindrical portion 28 of the first component 22 from the pocket 26 of the second component 24 when the permanent shape of the SMP forming the pocket 26 is the initial shape.

Figure 3:
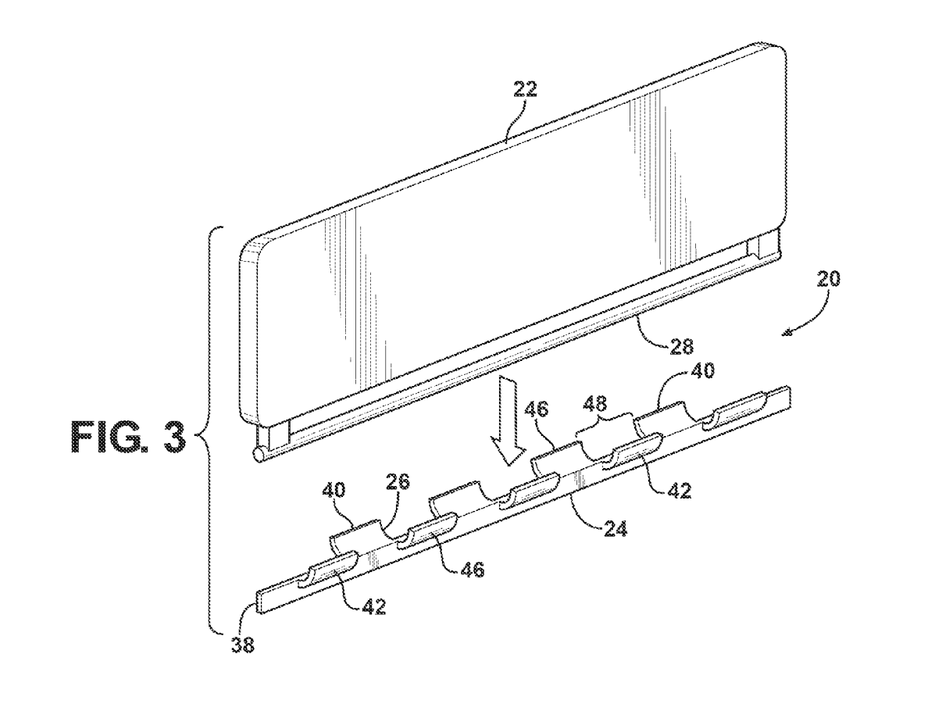
FIG. 3 is a schematic perspective view of a second embodiment of the releasable connection in a disassembled state.
Figure 4:
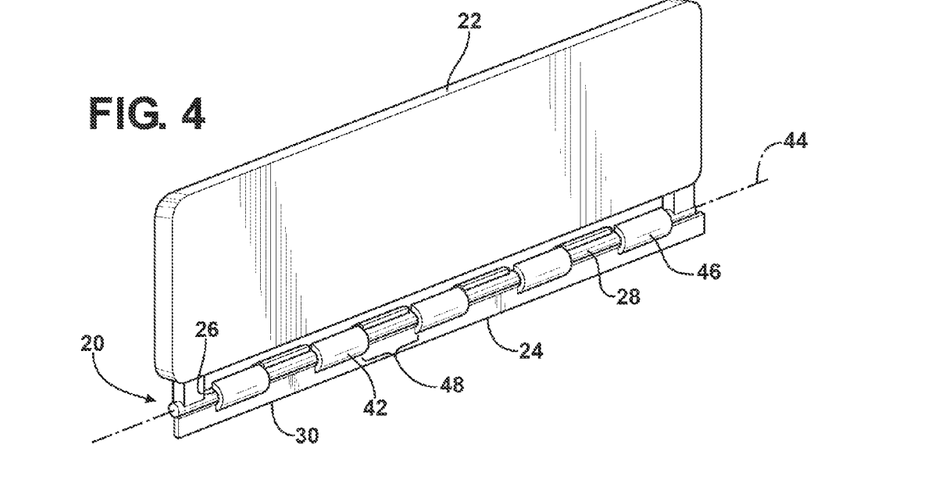
FIG. 4 is a schematic perspective view of the second embodiment of the releasable connection in an assembled state.

Referring to FIGS. 3 and 4, a second alternative embodiment of the releasable connection 20 is shown. The releasable connection 20 is shown as a hinge in FIGS. 3 and 4. The second component 24 includes a base 38, a first wall 40 and a second wall 42. The first wall 40 and the second wall 42 are disposed on opposite lateral edges of the base 38 in opposition to each other, and extend along a longitudinal axis 44. Each of the first wall 40 and the second wall 42 include a plurality of wings 46 spaced relative to each other along the longitudinal axis 44. Each adjacent pair of wings 46 defines a gap therebetween. Accordingly, each of the first wall 40 and the second wall 42 include a plurality of gaps 48 disposed between the wings 46. As shown, the wings 46 on the first wall 40 are offset from the wings 46 on the second wall 42 along the longitudinal axis 44. However, it should be appreciated that the wings 46 on the first wall 40 and the second wall 42 may alternatively be disposed directly opposite each other. The pocket 26 includes a channel defined by and between the base 38, the first wall 40 and the second wall 42. More specifically, the pocket 26 is defined by the base 38, the wings 46 of the first wall 40 and the wings 46 of the second wall 42. The pocket 26 extends along the longitudinal axis 44. The portion 28 of the first component 22 disposed within the pocket 26 includes a cylindrical shaft portion 28 extending along the longitudinal axis 44.

As shown in FIG. 3, the wings 46 of the first wall 40 and the wings 46 of the second wall 42 are disposed in a generally horizontal fashion relative to the base 38, and define a generally open concave shape when in their initial shape. The initial shape shown in FIG. 3 is the permanent shape of the SMP. Upon transformation into the connected shape shown in FIG. 4, i.e., the temporary shape of the SMP, the wings 46 on the first wall 40 and the second wall 42 are bent upward and inward toward each other to enclose the cylindrical shaft portion 28 of the first component 22, and define a generally cylindrical pocket 26. Accordingly, the cylindrical shaft portion 28 of the first component 22 is moveable within the cylindrical pocket 26. It should be appreciated that the movement of the cylindrical shaft portion 28 within the cylindrical pocket 26 includes an engineered, i.e., intended movement along a plane or axis, and excludes minor movement caused by excessive wear of the releasable connection 20 and/or improper assembly of the releasable connection 20. More specifically, the first component 22 is rotatable about the longitudinal axis 44 relative to the second component 24. Additionally, a resistance to movement of the second component 24 relative to the first component 22 is adjustable. The resistance to movement may be adjusted, for example, by varying a gap and/or a contact pressure between the cylindrical portion 28 and the cylindrical pocket 26. As such, the resistance to movement may be adjusted to account for wear of the releasable connection 20 over time by adjusting the geometry of the releasable connection 20 to vary the gap and/or contact pressure.

As briefly described above, the first wall 40 and the second wall 42 may be automatically returned to their initial shape, i.e., the generally open concave shape, upon being heated to the switching temperature in the absence of any external forces or obstacles to release the cylindrical shaft portion 28 of the first component 22 from the pocket 26 of the second component 24.

Referring to FIGS. 5 and 6A through 6D, a third alternative embodiment of the releasable connection 20 is shown. The releasable connection 20 is shown as a detachable trim piece in FIGS. 5 and 6A through 6D. The second component 24 includes a base 50, a first wall 52 and a second wall 54. The first wall 52 and the second wall 54 are disposed on opposite lateral edges of the base 50 in opposition to each other. The base 50, the first wall 52 and the second wall 54 extend along a longitudinal axis. The pocket 26 includes a channel defined by and between the base 50, the first wall 52 and the second wall 54. The pocket 26 extends along the longitudinal axis. The first wall 52 and the second wall 54 each include a ridge 56 disposed on distal edges, i.e., the edges furthest from the base 50, of the first wall 52 and the second wall 54 respectively. The ridges 56 extend inward toward each other, into the pocket 26. The portion 28 of the first component 22 disposed within the pocket 26 includes a plurality of latch portions 28. The latch portions 28 include a series of planar members attached together to define a generally diamond shaped spring portion 28. The diamond shaped spring portion 28 is configured to bias against and between the first wall 52 and the second wall 54. The diamond shaped spring portions 28 of the first component 22 each include at least one, but preferably a pair, of detents 58. The detents 58 are disposed in interlocking engagement with each of the ridges 56 of the first wall 52 and the second wall 54 respectively, when the second component 24 is in the connected shape.

Figure 5:
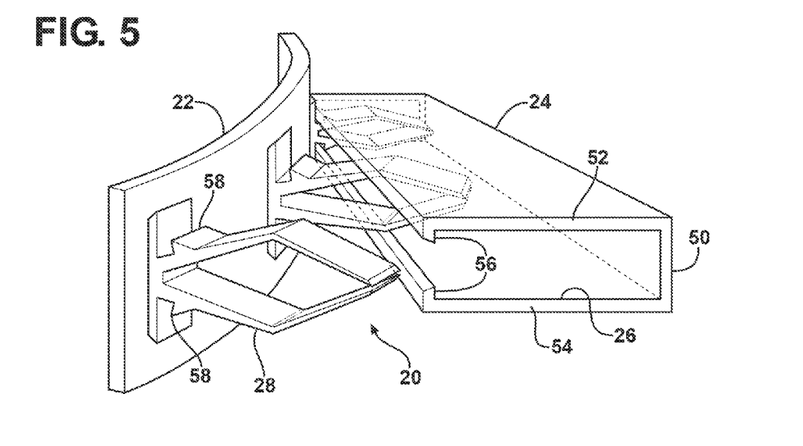
FIG. 5 is a schematic perspective view of a third embodiment of the releasable connection in a partially assembled state
Figure 6A:
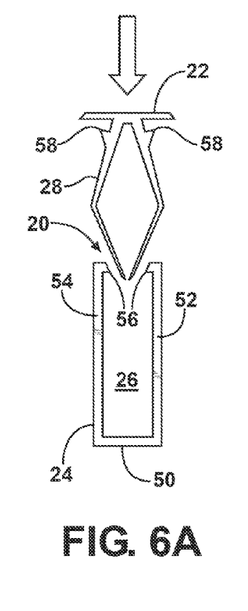
FIGS. 6A, 6B, 6C and 6D are schematic cross sectional views of the third embodiment of the releasable connection.
Figure 6B:
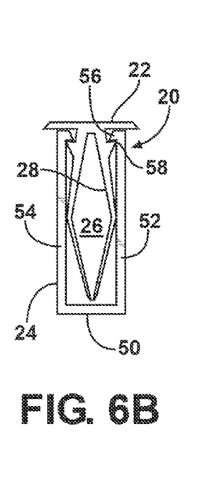

As shown in FIG. 5, the first wall 52 and the second wall 54 include a generally vertical shape, are generally perpendicular to the base 50 and define a generally rectangular pocket 26 when in their initial shape. Because of the portions 28 of the first component 22 disposed within the pocket 26 include collapsible spring portions 28, the pocket 26 in the third alternative embodiment of the releasable connection 20 does not need to be heated to the switching temperature to transform the pocket 26 from the initial shape into the connected shape. Rather, as shown in FIG. 6B, upon insertion of the diamond shaped spring portions 28 of the second component 24 into the pocket 26, the detents 58 engage the ridges 56 in interlocking engagement, i.e., snap together, to define the connected shape. However, it should be appreciated that heating one or both of the first component 22 and the second component 24 to the switching temperature may ease insertion into the pocket 26.

Figure 6C:
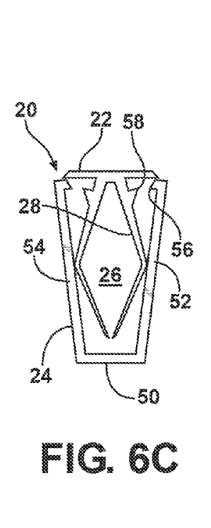
Figure 6D:
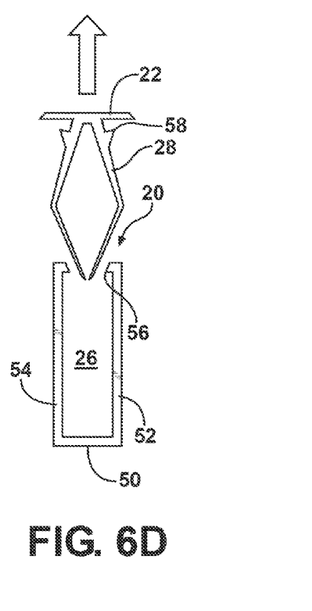

Referring to FIG. 6C, in order to release the first component 22 from the second component 24, the second component 24 is heated to or near the switching temperature, at which point the spring force of the diamond shaped spring portions 28 is sufficient to spread the first wall 52 from the second wall 54, thereby disengaging the interlocking engagement between the ridges 56 and the detents 58. Once the interlocking of the ridges 56 and the detents 58 is disengaged, the first component 22 may be removed from the second component 24 and the pocket 26 returns to the initial shape, as shown in FIG. 6D.

Figure 7:
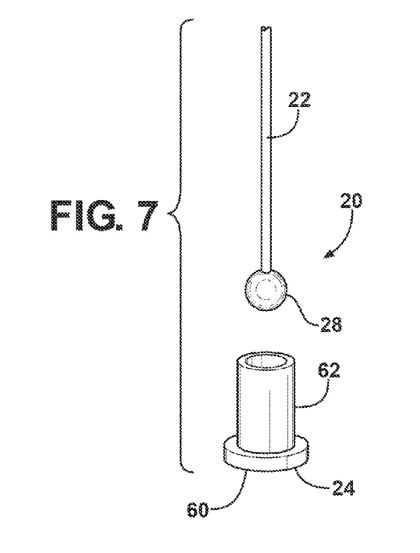
FIG. 7 is a schematic perspective view of a fourth embodiment of the releasable connection in a disassembled state
Figure 8:
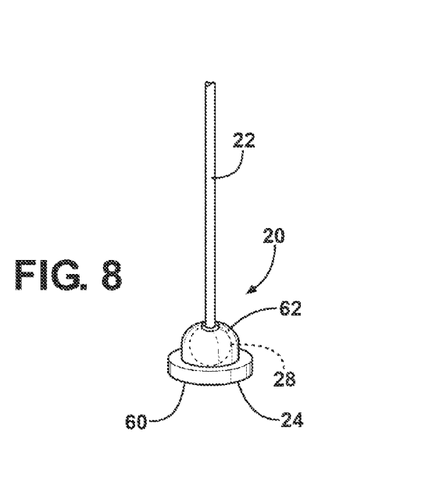
FIG. 8 is a schematic perspective view of the fourth embodiment of the releasable connection in an assembled state

Referring to FIGS. 7 and 8, a fourth alternative embodiment of the releasable connection 20 is shown. The releasable connection 20 is shown as a socket connection in FIGS. 7 and 8. The second component 24 includes a base 60 and a wall 62. The base 60 and the wall 62 cooperate to define the pocket 26. More specifically, the base 60 and the wall 62 define a semi-spherical dome shaped pocket 26. The portion 28 of the first component 22 disposed within the pocket 26 includes a bulbous end portion 28. More specifically, the bulbous end portion 28 includes a spherical portion 28.

As shown in FIG. 7, the wall 62 includes a generally vertical, cylindrical wall 62 extending upward away from the base 60, thereby defining a generally cylindrical pocket 26 when in the initial shape. Upon transformation into the connected shape shown in FIG. 8, i.e., the temporary shape, the distal edge of the cylindrical wall 62, i.e., the edge furthest from the base 60, curl inward toward a center of the cylindrical wall 62 to define the semi-spherical dome shaped pocket 26. Accordingly, the first component 22 is moveable within the pocket 26 of the second component 24, relative to the second component 24. It should be appreciated that the movement of the spherical portion 28 within the semi-spherical dome shaped pocket 26 includes an engineered, i.e., intended movement along a plane or axis, and excludes minor movement caused by excessive wear of the releasable connection 20 and/or improper assembly of the releasable connection 20. More specifically, the spherical portion 28 of the first component 22 is pivotable within the semi-spherical dome shaped pocket 26. Additionally, a resistance to movement of the second component 24 relative to the first component 22 is adjustable. The resistance to movement may be adjusted, for example, by varying a gap and/or a contact pressure between the spherical portion 28 and the semi-spherical dome shaped pocket 26. As such, the resistance to movement may be adjusted to account for wear of the releasable connection 20 over time by adjusting the geometry of the releasable connection 20 to vary the gap and/or contact pressure.

If the cylindrical shape of the wall 62 shown in FIG. 7 is the permanent shape of the SMP, then the wall 62 may be returned to the initial shape, i.e., the cylindrical shape, upon being heated to the switching temperature in the absence of any external forces and/or obstacles, thereby releasing the spherical portion 28 of the first component 22 from the pocket 26 of the second component 24.

Figure 9:
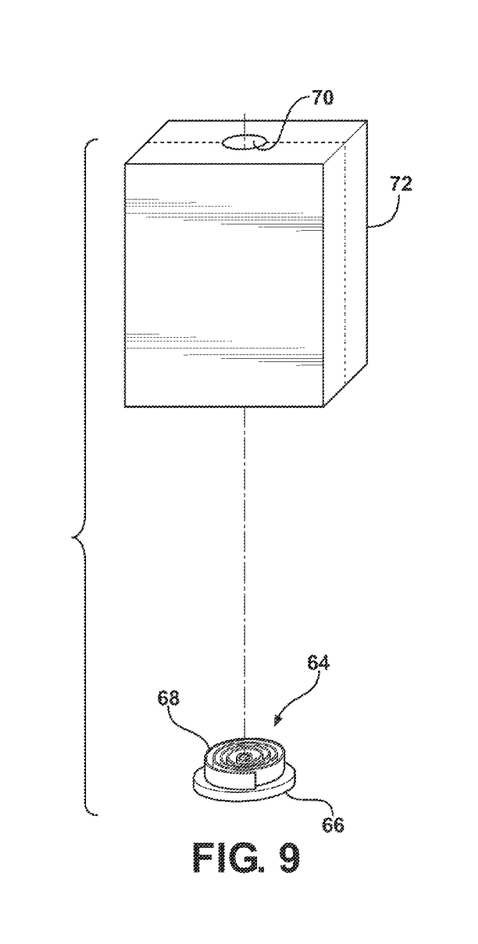
FIG. 9 is a schematic perspective view of a releasable fastener.
Figure 10:
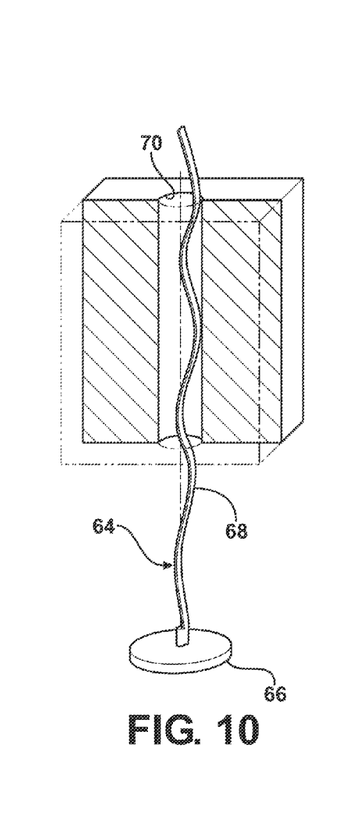
FIG. 10 is a schematic perspective view of the releasable fastener being inserted through a substrate.
Figure 11:
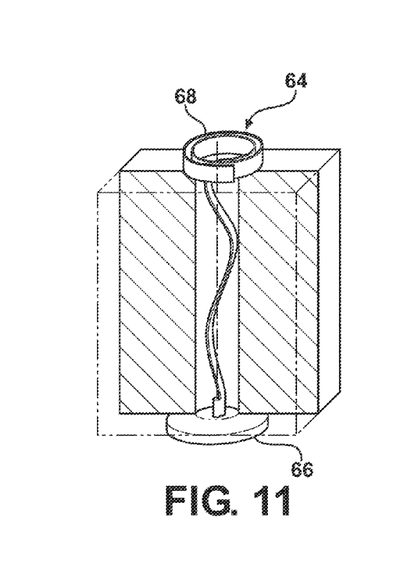
FIG. 11 is a schematic perspective view of the releasable fastener securing the substrate.

Referring to FIGS. 9, 10 and 11, a releasable fastener is shown generally at 64. The releasable fastener 64 includes a base 66 and an extendable member 68. The extendable member 68 is attached to the base 66, and includes and is manufactured from a Shape Memory Polymer (SMP).

Preferably, the extendable member 68 includes a curvilinear member, and defines an initial position. Preferably, the initial position of the extendable member 68 includes a coiled position, which is also the permanent shape of the SMP. However, it should be appreciated that the initial position may include some other position not shown herein, such as a back and forth serpentine configuration. The extendable member 68 is extendable from the initial position upon heating to the switching temperature. FIG. 10 shows the extendable member 68 in the temporary position of the SMP. The temporary position of the SMP is achieved by heating the extendable member 68 above the switching temperature and applying a force to the extendable member to draw the extendable member 68 out into an extended, i.e., elongated configuration, and then cooling the extendable member 68 to below the switching temperature to lock in the temporary position of the SMP. The extendable member 68 will retain the temporary position until heated to or above the switching temperature. As shown in FIG. 10, extending the extendable member 68 permits an end portion of the extendable member 68 to pass through an opening 70 in a substrate 72. FIG. 11 shows a partially recovered permanent shape of the extendable member 68. The partially recovered permanent shape is achieved by inserting the extendable member 68 through the opening 70 in the substrate when in the temporary shape, holding the relative position of the fastener 64 relative to the substrate 72 and heating the extendable member 68 to the switching temperature without applying any external loads or obstacles other than the substrate 72 to the extendable member 68. Cooling the extendable member locks in the permanent shape of the SMP unit heated to or above the switching temperature. As such, once heated to the switching temperature, the unrestrained portion of the extendable member 68, which extends past the opening 70, transforms back into the permanent shape, i.e., the coiled shape, whereas the restrained part whose recovery is obstructed by the substrate 72, remains in a partially recovered temporary shape. Accordingly, as shown in FIG. 11, the end portion of the extendable member 68 is configured for returning to the initial position of the extendable member 68 upon cooling. Once the end portion of the extendable member 68 returns to the initial position, i.e., the coiled shape, the coiled end portion of the extendable member secures the substrate 72 between the base 66 and the coiled end portion of the extendable member 68.

The releasable connection 20 achieved by the releasable fastener 64 may be disconnected by heating the end portion 28 of the extendible member to the switching temperature and applying an extending force to extend the extendable member 68, thereby straightening the extendable member 68. Once the end portion of the extendable member 68 is straightened, the extendable member 68 may be pulled through the opening 70 in the substrate 72, thereby releasing the substrate 72. As the extendable member 68 cools, the extendable member 68 returns to the initial shape if no external forces or obstacles are applied.

The invention further discloses a method of manufacturing a releasable connection 20. As described above, the releasable connection 20 is between the first component 22 and the second component 24, with the second component 24 including and being manufactured from the Shape Memory Polymer. Details of the SMP are described in greater detail below. The method includes forming the second component 24 into an initial shape to define a pocket 26. The pocket 26 may include any suitable size, shape and/or configurations, such as the rectangular shaped pocket 26 that extends along the longitudinal axis, or the cylindrical pocket 26 described above. It should be appreciated that the initial shape of the pocket 26 is not limited to the pockets 26 described herein, and may include other initial shapes.

The method further includes inserting the portion 28 of the first component 22 into the pocket 26. The portion 28 of the first component 22 is inserted into the pocket 26 when the pocket 26 is in the initial shape of the pocket 26, i.e., the initial shape of the pocket 26 permits insertion of the portion 28 therein. The portion 28 of the first component 22 may include any suitable shape, size and/or configuration, such as the cylindrical portion 28, the spherical portion 28 or the diamond shaped spring portion 28 described in detail above. It should be appreciated that the portion 28 of the first component 22 may include a shape, size and/or configuration other than described herein.

The method further includes heating the second component 24 to or above the switching temperature. More specifically, the second component 24 may be heated to the forming temperature to ease the programming of the SMP. The switching temperature is the temperature at which the SMP switches into a soft, leathery state, thereby permitting deformation of the SMP. Accordingly, the second component 24 is malleable at or above the switching temperature. Furthermore, the stiffness of the second component 24 is less than the stiffness of the first component 22 at the switching temperature, which ensures that the shape of the first component 22 is not altered. The second component 24 may be heated in any suitable manner, including but not limited to, heating with hot air or heating in a liquid bath.

If the connected shape is equal to the temporary shape of the SMP, then the method further includes deforming the pocket 26 into the connected shape once the second component 24 is heated to or above the switching temperature. However, if the connected shape is equal to the permanent shape of the SMP, then deforming the pocket 26 into the connected shape simply requires heating the SMP of the second component 24 to the forming temperature in the absence of any external forces and obstacles other than those associated with the first component 22 and the second component 24 being connected. The pocket 26 is deformed to grasp the first component 22 and secure the first component 22 relative to the second component 24. Deforming the pocket 26 into the connected shape may include forming the pocket 26 from the initial shape into any suitable connected shape, such as the cylindrical pocket 26 or the semi-spherical dome shaped pocket 26 described above. It should be appreciated that the pocket 26 may be deformed into some other connected shape not shown or described herein. Deforming the pocket 26 into the connected shape may be achieved by any suitable manner, such as by applying pressure to the pocket 26 or forming the connected shape in a mold. Particularly, a specialized tool may be used to simultaneously heat and shape the SMP to define the pocket 26. The specialized tool allows the SMP to be formed into consistent temporary shapes. Preferably, the specialized tool heats the SMP, and applies a force to the SMP to conform the SMP into a template or mold when hot and hold the SMP in that shape while the SMP cools. However, it should be appreciated that the specialized tool may operate in some other manner not described herein.

The method further includes cooling the pocket 26 while maintaining the connected shape of the pocket 26 until the second component 24 independently retains the connected shape. The pocket 26 is cooled to below the switching temperature, and more specifically, the pocket is cooled to or below the setting temperature. Accordingly, if pressure is applied to deform the initial shape of the pocket 26 into the connected shape, then the pressure may be maintained until the SMP material of the second component 24 is cooled. Once the SMP of the second component 24 cools below the switching temperature, the second component 24 retains the connected shape, and the pressure may be removed. Preferably, however, the SMP of the second component 24 is allowed to cool to a temperature below the setting temperature to ensure consistent properties of the releasable connection 20. It should be appreciated that the shape of the connected pocket 26 may be maintained in some other suitable manner not described herein while the SMP material of the second component 24 cools.

Because of the inherent physical properties of the SMP material, if the initial shape is equal to the permanent shape, then the pocket 26 of the second component 24 may be returned to the initial shape from the connected shape in response to re-heating the second component 24 to the switching temperature without application of any external forces and/or obstacles that may prevent shape recovery. Alternatively, if the initial shape is equal to the temporary shape, then the pocket 26 of the second component 24 may be returned to the initial shape from the connected shape in response to re-heating the second component 24 to the forming temperature while applying a force to temporarily deform the SMP of the second component 24 to allow separation of the releasable connection 20. Returning the pocket 26 to the initial shape permits release, i.e., removal, of the first component 22 from the pocket 26 of the second component 24. As such, the method may further include re-heating the second component 24 to transform the pocket 26 of the first component 22 from the connected shape back into the initial shape to disassemble the releasable connection 20.

The SMP of the releasable connection 20 should include 1) a joining temperature that is sufficiently higher than a maximum operation temperature of the releasable connection 20; 2) a storage modulus at the joining temperature that is sufficiently low to allow it to be elastically deformed with minimal force; 3) a high elongation to failure at the joining temperature to allow the SMP to deform significantly such that is can assume complex shapes that produce strong and stable joints; and 4) a finite rubbery plateau (typically >5° C.).

Shape memory polymers are compositions of those polymer molecules that exhibit a substantial and reversible change in their elastic modulus when their temperature is increased above a characteristic temperature, known as the switching temperature (Ts). Sometimes the means by which such temperature increase is accomplished is termed "activation" of the shape memory material. When the temperature of a SMP is raised above its Ts, its modulus of elasticity decreases dramatically often by a factor of ten or a hundred, or more. One type of SMP is a group of semi-crystalline copolymers comprising relatively hard, crystalline segments (or micro phases) and relatively soft, amorphous segments (or micro phases). In this case, the Ts of the copolymer is the glass transition temperature (Tg) of the soft amorphous phase. The soft amorphous segment is the lower temperature softening phase of the shape memory polymer and the elastic modulus of the copolymer drops sharply when the temperature of the material is above its Ts due to a glassy to rubbery transition in the amorphous phase. Other types of SMPs, where the Ts corresponds to melting of one of the phases of the polymer are also known to exist. While the illustrated embodiments of this specification focus on the type of SMPs described above, the invention can be extended to the other types of SMPs without undue effort.

The second component 24 made of the SMP described above is imparted by a permanent shape by thermo-mechanical processing at a temperature above the melting point (Tm) of the hard segment. Subsequent cooling to a temperature below Ts results in a stiff polymer (e.g. E=800 MPa, where E is the modulus of elasticity of the polymer material at the relatively cold temperature). The material exists as a soft polymer (e.g. E=4 MPa) in the temperature range between Ts and Tm, thereby yielding a two hundred-fold reduction in elastic modulus in this example. When the material is in this temperature range above Ts, it can be deformed easily into different temporary shapes, i.e., the connected shape. The elastic elongation (or stretch range) of a typical SMP in its softened condition is about 100% to about 300% without permanent deformation. If the polymer is not degraded (e.g. by plastic yielding, heating beyond its oxidation temperature, etc.), the original permanent shape, i.e., the initial shape, can be recovered by soaking it at a temperature above the Ts of the soft phase in the absence of external loads. Strains of up to 200%-300% can be recovered in this manner. The SMP material is known to withstand hundreds of cycles of heating with deformation to set a temporary shape, i.e., connected shape, and/or heating to recover the permanent shape, i.e., initial shape.

The releasable connection 20 of this invention utilizes a suitable difference between the lower modulus of elasticity of the soft polymer state of the SMP and the higher modulus of the stiff polymer state to, first, establish a soft connection between the SMP second component 24 and the first component 22 and, then, retain a strong connection. The first component 22 may be of any material having suitable stiffness to accomplish the joining process. In many situations the first component 22 may be a metal component Important thermal processing characteristics of suitable shape memory polymers have been described above in this specification. Such SMP materials may also otherwise be characterized as thermoplastic polymers, thermoset polymers, or thermoplastic or thermosetting polymers with interpenetrating networks, semi-interpenetrating networks, or mixed networks. The polymers may be a single polymer or a blend of polymers. The polymers may be linear or branched polymeric elastomers with side chains or dendritic structural elements. Shape memory materials are characterized by the presence of two phases, an amorphous or glassy phase (or segment) and a semi-crystalline or crystalline phase (or segment). SMPs have been formed of suitable compositions of urethane copolymers, urethane-diol copolymers, epoxy-cyanate copolymers, and many other copolymer compositions. SMP materials are available for many applications. Their usage in practices of this invention is largely based on being suitably deformable for the transformation between the connected shape and the initial shape, and on the SMP being suitably strong at the desired operating temperature of the attached components.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), ply(butyl methacrylate), poly (isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly (ethylene terephthalate), polyethylene/nylon (graft copolymer), polycaprolactones-polyamide (block copolymer), poly (caprolactone)dimethacrylate-n-butyl acrylate, poly (norbornyl-polyhedral oligomeric silsequioxane), polyvinylchloride, urethane/butadiene copolymers, polyurethane block copolymers, styrene-butadiene-styrene block copolymers, and the like.

In accordance with this invention it is preferred that the Ts of the SMP second component 24 be attainable for a joining operation and above the anticipated operating temperature of the joined components. The difference in elastic modulus of the inactivated SMP second component 24, $E_{inactive}$, and the modulus of the activated SMP second component 24, $E_{active}$, is important in this joining process. It is preferred that the ratio, $E_{inactive} E_{active}$ be reasonably high for easy and effective displacement of shape memory material for the forming process while retaining high strength of the formed joint. A ratio of at least 10 is suitable, while a ratio of 50 to about 200 is preferred.

The temperature needed for permanent shape recovery can usually be set at any temperature between about −63° C. and about 120° C., or above. Engineering the composition and structure of the polymer itself can allow for the choice of a particular temperature for a desired application. A preferred temperature for shape recovery is greater than about 120° C.

A most common activator of SMP components is heat. However, depending on the specific SMP material, a component may be activated for joining by means such as electricity, light or other electromagnetic radiation of suitable frequency, pressure, vibration, change in pH, and/or change in the content of a plasticizer, e.g., moisture.

While the best modes for carrying out the invention have been described in detail, those familiar with the art to which this invention relates will recognize various alternative designs and embodiments for practicing the invention within the scope of the appended claims.

The invention claimed is:

1. A releasable connection comprising:
   a first component; and
   a second component defining a pocket, wherein one of said first component and said second component is manufactured from a shape memory polymer having a stiffness at a switching temperature that is less than a stiffness of the other of said first component and said second component at or above said switching temperature;
   said first component including a portion disposed within said pocket with said pocket formed into a connected shape configured for securing said first component relative to said second component;
   wherein said first component is moveable relative to said second component; and
   wherein one of said first component and said second component is transformable from one of an initial shape and said connected shape into the other of said initial shape and said connected shape for one of assembling and releasing said portion from said pocket in response to being heated to said switching temperature.

2. A releasable connection as set forth in claim 1 wherein said portion of said first component includes a bulbous end portion.

3. A releasable connection as set forth in claim 2 wherein said bulbous end portion includes one of a cylindrical portion and a spherical portion.

4. A releasable connection as set forth in claim 1 wherein said first component is slideably moveable along a longitudinal axis relative to said second component.

5. A releasable connection as set forth in claim 1 wherein said first component is rotatably moveable about a longitudinal axis relative to said second component.

6. A releasable connection as set forth in claim 1 wherein said first component is pivotably moveable relative to said second component.

7. A releasable connection comprising:
   a first component; and
   a second component defining a pocket, wherein one of said first component and said second component is manufactured from a shape memory polymer having a stiffness at a switching temperature that is less than a stiffness of the other of said first component and said second component at or above said switching temperature;

said first component including a portion disposed within said pocket with said pocket formed into a connected shape configured for securing said first component relative to said second component;

wherein one of said first component and said second component is transformable from one of an initial shape and said connected shape into the other of said initial shape and said connected shape for one of assembling and releasing said portion from said pocket in response to being heated to said switching temperature; and wherein said shape memory polymer of said second component includes a triple shape memory polymer transformable from a temporary shape into a connected shape upon being heated to a first temperature, and is transformable into a disconnected shape upon being heated to a second temperature different from said first temperature.

* * * * *